(12) United States Patent
Hoffman et al.

(10) Patent No.: US 7,127,378 B2
(45) Date of Patent: Oct. 24, 2006

(54) METHOD AND APPARATUS FOR ESTABLISHING THE LAYOUT OF A BUILDING

(75) Inventors: Eric Hoffman, Library, PA (US); Darin Ingimarson, Jefferson Boro, PA (US)

(73) Assignee: Quantapoint, Inc., Pittsburgh, PA (US)

( * ) Notice: Subject to any disclaimer, the term of this patent is extended or adjusted under 35 U.S.C. 154(b) by 0 days.

(21) Appl. No.: 10/196,522

(22) Filed: Jul. 15, 2002

(65) Prior Publication Data

US 2003/0011602 A1 Jan. 16, 2003

Related U.S. Application Data

(63) Continuation of application No. 09/012,937, filed on Jan. 24, 1998, now Pat. No. 6,446,030.

(51) Int. Cl.
*G06F 17/50* (2006.01)
*G06F 13/00* (2006.01)

(52) U.S. Cl. .................. 703/1; 703/2; 703/6; 702/159; 712/502

(58) Field of Classification Search .................. 703/1, 703/2, 6; 356/376, 4.02; 707/502; 702/159; 345/440, 419; 712/502
See application file for complete search history.

(56) References Cited

U.S. PATENT DOCUMENTS

| | | | | |
|---|---|---|---|---|
| 4,402,608 A | * | 9/1983 | DiMatteo et al. | 356/623 |
| 5,337,149 A | * | 8/1994 | Kozah et al. | 356/601 |
| 5,625,827 A | * | 4/1997 | Krause et al. | 715/502 |
| 5,668,736 A | * | 9/1997 | Douglas et al. | 703/1 |
| 6,006,021 A | * | 12/1999 | Tognazzini | 703/1 |
| 6,246,468 B1 | * | 6/2001 | Dimsdale | 356/4.02 |
| 6,446,030 B1 | * | 9/2002 | Hoffman et al. | 703/1 |
| 6,512,993 B1 | * | 1/2003 | Kacyra et al. | 702/159 |
| 2004/0051711 A1 | * | 3/2004 | Dimsdale et al. | 345/419 |

OTHER PUBLICATIONS

Anonymous, "World's First Integration of Handheld Laser Rangefinder With 'Smart' Drawing Software," Business Wire, p. 11021094 (downloaded text) (Nov. 2, 1995).*
Lowe, "Three-Dimensional Object Recognition from Single Two-Dimensional Images", Artificial Intelligence, vol. 31 Issue 3, pp. 355-395 (Mar. 1987).*
Debevec et al, "Modeling and Rendering Architecture from Photographs: A hybrid geometry- and image-based approach," Technical Report UCB//CSD-96-893 (Jan. 1996).*
Liedtke et al, "Use of Explicit Knowledge for the Reconstruction of 3-D Object Geometry", 6th International Conference on Computer Analysis of Images and Patterns (Sep. 1995).*

(Continued)

*Primary Examiner*—Thai Phan
(74) *Attorney, Agent, or Firm*—Ansel M. Schwartz

(57) ABSTRACT

An apparatus for establishing a layout of a building. The apparatus includes a mechanism for scanning a first room of the building to obtain room data. The apparatus also includes a scanner for forming a representation of a layout of the first room from the first room data. The forming mechanism is connected to the scanner. A method for establishing the layout of a building. The method includes the steps of placing a scanner in a first room of the building. Then there is the step of scanning the first room with the scanner to obtain first room data. Then there is the step of forming a representation of the layout of the first room from the first room data.

32 Claims, 2 Drawing Sheets

OTHER PUBLICATIONS

Hudson, "Reviews: Design Your Own Home," Compute, vol. 14 Issue 7, p. 110 (Aug. 1992).*

Cokal et al, "Development of an Image Processing System for a Special Purpose Mobile Robot Navigation," IEEE Proceedings of the Fourth Annual Conference on Mechatronics and Machine Vision in Practice, pp. 242-252 (Sep. 1997).*

Salvi et al, "Contribution to the Mobile Naviagation in Structured Indoor Environments Using Laser Beam Patterns," Procesings of the SPIE—The International Society for Optical Engineering, vol. 2785, pp. 193-203 (downloaded text abstract)(Jun. 1996).*

Lebegue et al, "Automatic Creation of Architectural CAD Models," IEEE Proceedings of the 1994 Second CAD-Based Vision Workshop, pp. 82-89 (1994).*

Sequeira et al, "3D Reconstruction of Indoor Environments," IEEE Proceedings of the International Conference on Image Processing, pp. 405-408 (1996).*

Cadplans, web page downloads from http://www.planfx.com.*

Anonymous, "PlanFX Even Usable by CAD Novices," Computer Dealer News, vol. 13, p. 74 (Nov. 1997).*

* cited by examiner

US 7,127,378 B2

METHOD AND APPARATUS FOR ESTABLISHING THE LAYOUT OF A BUILDING

This application is a continuation of application Ser. No. 09/012,937 filed on Jan. 24, 1998, now U.S. Pat. No. 6,446,030.

FIELD OF THE INVENTION

The present invention is related to establishing the layout of a building. More specifically, the present invention is related to establishing the layout of the building with a laser rangefinder.

BACKGROUND OF THE INVENTION

The ability to measure as-built residential, commercial, and industrial structures is becoming increasingly important for real estate marketing and remodeling. The current state of the art in this field is manual measurement and sketching which is not cost effective enough to meet the demands of these applications. The present invention will overcome these problems and provides a system that will meet the existing demand for fast, low cost floor plan measurement.

SUMMARY OF THE INVENTION

The present invention pertains to an apparatus for establishing a layout of a building. The apparatus comprises a mechanism for scanning a first room of the building to obtain room data. The apparatus also comprises a mechanism for forming a representation of a layout of the first room from the first room data. The forming mechanism is connected to the scanner.

The present invention pertains to a method for establishing the layout of a building. The method comprises the steps of placing a scanner in a first room of the building. Then there is the step of scanning the first room with the scanner to obtain first room data. Then there is the step of forming a representation of the layout of the first room from the first room data.

The present invention pertains to a floor plan mapping apparatus which is comprised of a scanning laser range sensor, a portable computer, and a WindowsXX based user interface. The apparatus has the capability of quickly generating accurate floor plans of existing residential, commercial, and industrial structures.

The laser scanner extracts 3D information from the walls of each room in which it is placed. The 3D information is returned as a set of data points. The point set is processed by a set of algorithms which will convert the data points into line segments represented in an industry standard data format (such as DXF). The operator uses an interactive interface to add standard architectural details which cannot be reasonably represented by the laser range data. This includes bathroom fixtures, window details, appliances, and others. The result is further processed to generate a professional looking line drawing with notations which can be printed, inserted as an image in other documentation, or placed directly on a Web Site.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
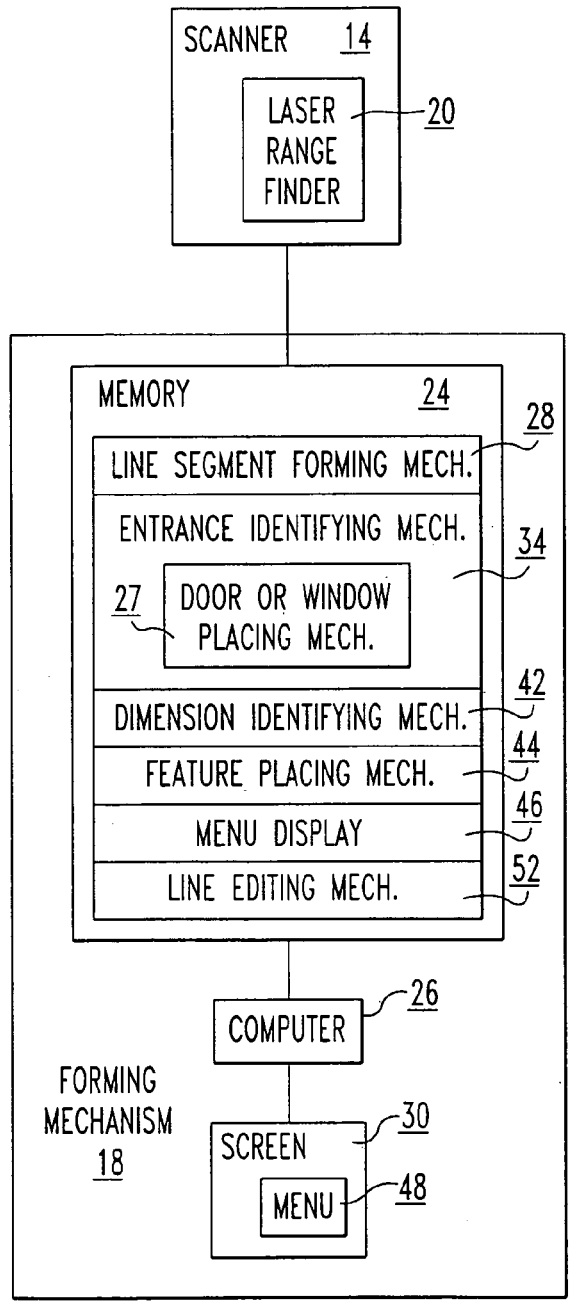
FIG. 1 is a schematic representation of an apparatus of the present invention.
Figure 2:
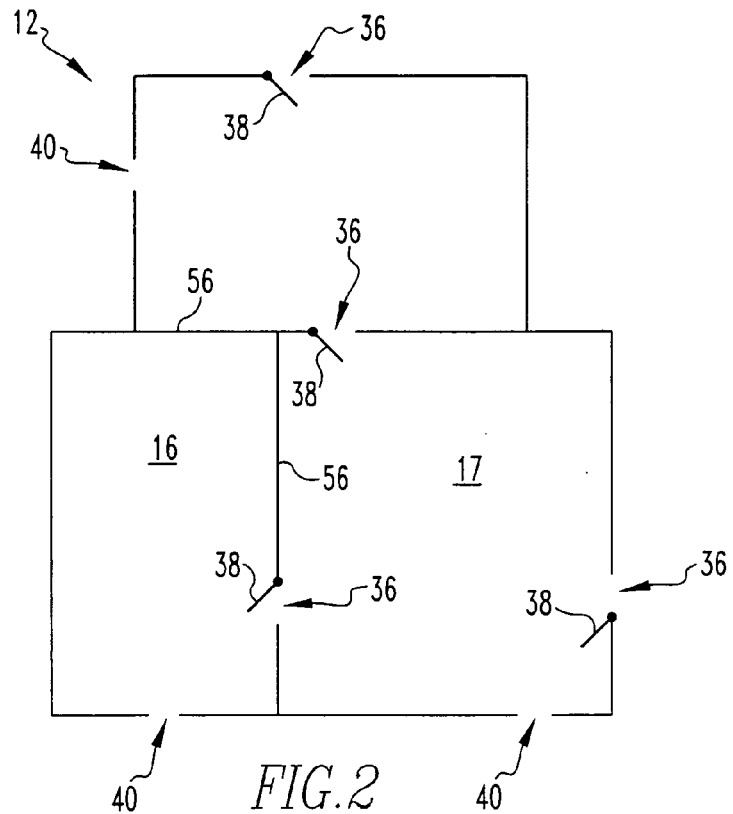
FIG. 2 is a layout of a building.
Figure 3:
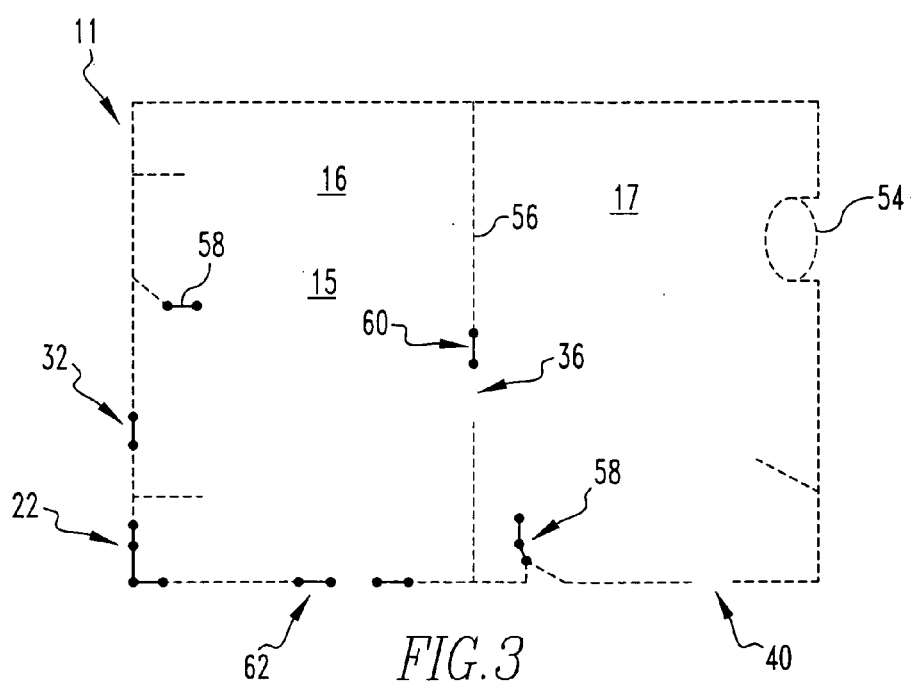
FIG. 3 is a representation of a layout of a first room and a second room with respect to the present invention.

Referring now to the drawings wherein like reference numerals refer to similar or identical parts throughout the several views, and more specifically to FIGS. 1 and 2 thereof, there is shown an apparatus 10 for establishing a layout 11 of a building 12. The apparatus 10 comprises a scanner 14 for scanning a first room 16 of the building 12 to obtain room data. The apparatus 10 also comprises a mechanism 18 for forming a representation of a layout 15 of the first room 16 from the first room data, as shown in FIG. 3. The forming mechanism 18 is connected to the scanner 14.

The scanner 14 preferably includes a laser rangefinder 20 which obtains point data 22 for the room data from the first room 16. Preferably, the forming mechanism 18 includes a memory 24 which stores the room data. The memory 24 is connected to the laser rangefinder 20. The forming mechanism preferably forms a representation of the layout 15 of the first room 16 with an entrance 36 of the first room 16 from the first room data. Preferably, the forming mechanism 18 includes a computer 26 connected to the memory 24. The memory 24 preferably has a mechanism 28 for forming line segments 32 from the point data 22 of the first room data. The line segment forming mechanism 28 is connected to the computer 26. Preferably, the forming mechanism 18 includes a screen 30 connected to the computer 26 which shows the line segments 32 which represent the layout 15 of the first room 16.

Preferably, the memory 24 includes a mechanism 34 for identifying an entrance 36 from the point data 22. The entrance identifying mechanism 34 is connected to the computer 26. The entrance 36 can be a door 38 or window 40.

Preferably, the entrance identifying mechanism 34 includes a mechanism 27 for placing a door 38 or window 40 at an entrance 36 within the line segments 32 as part of the room data. The door or window placing mechanism 27 is connected to the computer 26. The memory 24 preferably includes a mechanism 42 for identifying dimensions of the first room 16 from the room data. The dimension identifying mechanism 42 is connected to the computer 26. The memory 24 preferably includes a mechanism 44 for placing a feature 54 into the line segments 32 of the room data. The feature placing mechanism 44 is connected to the computer 26. Preferably, the memory 24 includes a mechanism 46 for displaying a menu 48 having symbols 50 of features 54, a door 38 and a window 40 on the screen 30. The symbols 50 are able to be chosen from the menu 48 and placed in the line segments 32 on the screen 30 of the room data. The displaying mechanism 46 is connected to the computer 26. Preferably, the memory 24 includes a mechanism 52 for editing the line segments 32 of the room data. The editing mechanism 52 is connected to the computer 26.

Figure 4:
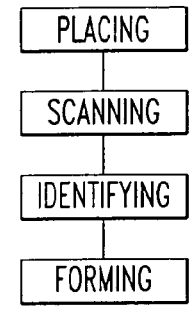
FIG. 4 is a flow chart of the method of the present invention.

The present invention pertains to a method for establishing the layout 11 of a building 12, as shown in FIG. 4. The method comprises the steps of placing a scanner 14 in a first room 16 of the building 12. Then there is the step of scanning the first room 16 with the scanner 14 to obtain first room data. Then there is the step of forming a representation of the layout of the first room 15 from the first room 16 data.

Preferably, after the first room 16 scanning step, there is the step of identifying an entrance 36 to the first room 16 from the first room data. The forming step preferably includes the step of forming a representation of the layout of the first room 15 with the entrance 36 of the first room 16. There is preferably the step of identifying dimensions of the first room 16 associated with length and width. Preferably, after the first room 16 scanning step, there are the steps of removing the scanner 14 from the first room 16. Then there is the step of placing the scanner 14 in a second room 17 adjacent the first room 16. Next there is the step of scanning the second room 17 with the scanner 14 to obtain second room 17 data. Then there is the step of combining the second room 17 data with the first room 16 data. Next there is the step of forming a representation of a layout of the first room 15 with the entrance 36 and the second room 17 from the first room 16 data and the second room 17 data. The step of combining preferably includes the step of aligning a representation of a common wall 56 of the first room 16 data and the second room 17 data.

Preferably, the identifying the entrance 36 step includes the step of identifying a door 38 in the first room 16. Preferably, the identifying the door 38 step includes the step of adding a representation of the door 38 to the first room 16 data. After the identifying the door 38 step, there is preferably the step of identifying a window 40 in the first room 16. Preferably, the identifying the window 40 step includes the step of adding a representation of the window 40 to the first room 16 data. After the identifying the door 38 step, there is preferably the step of adding a representation of a feature 54 to the first room 16 data. The forming step preferably includes the step of forming the representation of the layout of the first room 15 with the door 38, window 40, feature 54 and floor covering from the first room 16 data and the second room 17 from the second room 17 data. Preferably, the step of adding a feature 54 includes the step of adding a representation of a fireplace, appliance, toilet, tub, sink, cabinet or shower to the first room 16 data.

Preferably, after the step of adding a representation of a feature 54, there is the step of adding a representation of a floor covering to the first room 16 data. The step of adding a representation of floor covering preferably includes the step of adding a representation of hardwood, wall-to-wall carpet, vinyl or ceramic to the first room 16 data.

Preferably, the scanning step includes the step of emitting a laser beam repeatedly around the first room 16 and obtaining point data 22 from reflections of the laser beam from the first room 16 to obtain first room 16 data. After the emitting step, there is preferably the step of connecting the point data 22 to form line segments 32 that represent the layout of the first room 15. After the connecting step, there is preferably the step of eliminating erroneous line segments 58.

Preferably, the identifying a door 38 step includes the step of placing a representation of a door 38 between associated door line segments 60 that are a predetermined distance apart. The identifying a window 40 step preferably includes the step of placing a representation of a window 40 between associated window line segments 62. The step of placing a representation of a door 38 preferably includes the step of viewing the line segments 32 on a screen 30 and picking a symbol of a door 38 from a window 40 menu 48 on the screen 30 and dragging the symbol of the door 38 from the window 40 menu 48 to between the associated door line segments 60.

In the operation of the preferred embodiment, the generation of floor plan information from a set of scan points involves a deliberate reduction of the scale of data representing a room. In the domain of the scan head, the room will be represented by a set of range and azimuth points, each representing a measurement point in space. At a larger scale of abstraction, the room will be represented as a set of walls, doors 38, windows 40, and other suitable architectural features 54.

Through a structured set of data analysis techniques, each identifying more abstract features 54, it will be possible to generate a floor plan from the raw scan data.

Most of the point data 22 will result in lines which delineate the location of walls. It will be important to automate as much of this process as possible. Floor plan mapping will only be successful if most of the work is automated.

The scanner 14 will return room scan data in the form of a range measurement and an azimuth angle. This data will be sorted in increasing azimuth order (to resolve any overlap of scan data resulting from mechanical overscan).

The resulting list of scan points will then be subjected to a set of transformations to identify relevant scan points outlining the boundaries of the room, and represent these boundaries in terms of a set of lines.

The initial set of scan data will be segmented into large sections for convenience in processing. Beginning at the lowest azimuth, the scan data will be grouped into associated scan segments. The grouping will be based upon comparing the distance of neighboring points to a suitable granularity measurement.

This will serve to conveniently divide the data set at large breaks in the room walls, such as at open doors 38 and windows 40 not covered by curtains. It also affords a convenient way to eliminate a large number of outlier data points returned from objects outside windows 40 and down hallways, etc.

The next stage of processing will recursively split the data segments into smaller portions until lines fitted to the data composing each segment fall within specified deviation criteria. The deviation criteria is given in terms of a maximum perpendicular distance from a test line that a point is allowed to be for the test line to be considered a good fit to the data.

The first step in this recursive algorithm will be to obtain a measurement of maximum deviation of a point set. This will be calculated by finding the point in the data segment having the maximum perpendicular distance from line drawn between the first and last points of the data segment. If this maximum distance is less than the specified deviation measurement, no further segmentation will be performed on that particular scan data segment.

If the maximum deviation is greater than the specified deviation measurement, then the data segment will be divided into two smaller segments with the division placed at the point of maximum deviation. The same segmentation test will then be performed on each of the two new data segments.

This algorithm will recurse down into the scan data set and identify candidate data segments for line fits. This will occur until each data segment satisfies the specified deviation measurement. The result will be a linked list of scan data sections, suitable for use in fitting line segments 32.

This section of the algorithm is based in part upon published work by D. G. Lowe of the University of British Columbia, Vancouver, Canada, incorporated by reference herein.

The segmented data will then be used to generate a set of lines representing flat surfaces in the scan image. These lines will be used as candidate surfaces for identification of walls, doors 38, and other features 54.

The method to be used is an eigenvector fit, which will assure a very accurate fit of a line to the data. The eigenvector fit will minimize the perpendicular distances between the points in the data segment and the line being fit to them.

The eigenvector fit will utilize a scatter matrix, formed by using a normalized set of range points, as described by:

$$\overline{S} = \sum_{i=1}^{n} \overline{v}_i \overline{v}_i^t$$

Where the normalized vectors are formed by subtracting the mean of the set of all points in the line segment from each individual point:

$$\overline{v}_i = \overline{p}_i - \overline{M}$$

The best line to fit to the data set is characterized by the unit normal vector N that best minimizes the following equation:

$$d^2(\overline{N}) = \overline{N}^t \overline{S} \overline{N}$$

The normal N may be found by taking N to be the eigenvector associated with the smallest eigenvalue. The eigenvalues may be solved for by the following:

$$|\overline{S} - \lambda \overline{I}| = 0$$

The eigenvector x for a given eigenvalue is given by:

$$|\overline{S} - \lambda \overline{I}| \overline{x} = 0$$

Since distinct eigenvectors of symmetric matrices are orthogonal, the best fit line is parallel to the eigenvector associated with the largest eigenvalue.

Once the appropriate eigenvector is determined, the endpoints of the data segment for which the eigenvector has been generated are reflected onto the line described by the eigenvector. This results in a line segment oriented parallel to the eigenvector found above, terminated in the physical model of the room at the beginning and end of the data segment.

Lines generated from point data 22 should be expressed in a CAD-style format and should be easy to manipulate manually. They should ignore local data noise, such as is produced by trim moldings around doors 38 and windows 40.

After obtaining the CAD-style representation of candidate wall surfaces, it will be necessary to perform some basic manipulation of the wall data, such as snapping corners to perpendicular, joining sections of wall occluded by furniture or wall hangings, and removing lines not associated with architectural features 54.

The scan data may contain information from wall hangings, furniture, or other obstructions which may not provide useful information in describing the room model. It should be possible to tag these line segments 32 as belonging to objects other than room walls. This will retain the line informations, but remove the lines from consideration as candidate wall surfaces.

The line segment identification and line-fitting techniques described above coupled with the nature of the scanner 14 data generate line segments 32 whose end-points may not necessarily connect with adjoining line segments 32. It will be necessary to identify, either manually or via an algorithm, those line segments 32 whose ends should be joined in the final floor plan model.

A preference menu 48 will determine if lines should be perpendicular. Most houses, especially older houses, will not measure square, however they should be represented on a floor plan as square. For applications in which the floor plan is to be used for renovation work, this preference will be turned off to allow actual as built measurements to be made.

Whenever possible, it will be beneficial to automatically recognize doors 38. Data scans should be performed with the doors 38 partially open. The scan should generate enough data across the door 38 to determine hinge point and direction of swing.

Heuristics may be necessary to resolve door 38 sizing issues. It is probable that there will be discrepancies in door 38 sizes between scans depending upon what was visible to the scanner 14. Doors 38 are not made in odd sizes however, and should probably be snapped to the closest standard size and the wall opening adjusted accordingly.

Windows 40 will be common to most rooms, therefore, an automatic method of locating and placing window 40 symbology is required. Windows 40 will most likely generate very scattered and noisy data as the laser reflects from or penetrates through the glass surface. These areas of non-regular data may be easy to detect, however the exact edges of the windows 40 may be more difficult to determine. It may be sufficient to snap the data to the nearest standard size, however there are many homes containing custom window 40 sizes.

When a suspected window 40 opening is detected, a window 40 symbol should be drawn anchored at the end points of the included wall.

Occasionally curved wall segments will be present. These must be represented in some way which is compatible with CAD formats. A spline of some sort is likely. Data points can be sampled to reduce the number of points in the spline fit.

Support columns will be common in basements and modern construction. These will be round columns but will scan only as arcs due to lines of sight. For these types of items, the theoretical center of the column is determined, and then a circle of the correct radius is inserted at the center.

A room plan can be completed in an average time of two minutes including scan time.

The following steps describe the process to create a floor plan.

Set Up
1. Enter the structure or building. Tripod is in one hand, scanner 14 head is in the other.
2. Assemble equipment. Attach scanner 14 head to tripod using quick attach mount and turn on system. It will be important to reduce the amount of boot time.
3. Secure window 40 coverings. While scanner 14 is booting, use tie straps to pull window 40 coverings away from window 40 edges. It is necessary to see all window 40 edges to generate good mapping data. Tie straps will be webbing with velcro closures.
4. Identify building. Either type in house address, or select building address from a jobs menu 48. Either a job identifier or the house address will be used to track the house throughout the process. All resultant files should contain both sets of identifiers.
5. Set scanner 14 in center (roughly) of room at a height just above head height. Important architectural features 54 should be in view, especially windows 40 and doors 38.

6. Select room type from menu 48. If non-standard room, then enter a room type. Typical standard types will be living, family, kitchen, master bedroom, etc.
7. Activate scan using display screen 30. Wait for scanner 14 to complete scan before doing anything else or moving the tripod.
8. Point data 22 from scan will appear on screen 30.
9. Automatic data reduction algorithms will complete as much of the floor plan as possible.
10. Remove obvious errors using line editing tools.
11. Add doors 38 using door 38 menu 48. The automatic algorithms will try to fill in as many doors 38 as it can. When possible the scan should be taken with doors 38 half open. Doors 38 that cannot be automatically placed will be placed using the door 38 placement tools. The tool will place a standard door 38 symbology between two designated points with the order of the points designating the hinge location. A third point will specify door 38 swing. Eventually types of doors 38 will be included for eventual 3D outputs. The eventual 3D extensions would have a menu 48 of standard door 38 types to choose from. The current software must handle standard doors 38, bi-folds, sliders, and a few others.
12. Add windows 40 using window 40 menu 48. The automatic algorithms will try to fill in as many windows 40 as it can. Windows 40 that cannot be automatically placed will be placed using the window 40 placement tools. The tool will place standard window 40 symbology between two designated points. Eventually types of windows 40 will be included for eventual 3D outputs. The eventual 3D extensions would have a menu 48 of standard window 40 types to choose from. The current software must handle standard windows 40 only.
13. Add other features 54 not shown in scan. This includes fireplaces, toilets, tubs, sinks, appliances, etc. These features 54 should be added through use of a symbology menu 48. Some of the symbols 50 will be fixed size, some can be stretched. All must be to scale.
14. Add floor covering type from menu 48. Might include hardwood, wall-to-wall carpet, vinyl, ceramic, or others.
15. Move scanning system to next room. Move as a single unit.
16. Repeat room measurement process.
17. Connect rooms on screen 30 map. This should be done mostly by computer 26. Select a common wall 56 and let the software do the rest.
18. Repeat process for all of the rest of the rooms on the floor. Hallways should be modeled as well. Stairs must be positioned using stair menu 48 feature 54. Closets should be modeled using either scanner 14 or hand measurements. Closets should be considered a separate room and labeled as a closet so that they are not labeled the same as a major room.
19. Specify exterior walls. Exterior walls will have a thicker line type than interior walls.
20. Check floor plan for completeness and consistency.
21. Move to next floor and repeat process. Be sure that stairs align correctly between floors. This should be an automatic feature 54 if possible. Make sure that common walls 56 are matched up.
22. Finish all floors of the building.
23. Perform any digital photography requested on job order.
24. Enter building descriptors from lists if requested.
25. Make sure all data is secure.
26. Shut down scanner 14 and disassemble.
27. Leave for next building.
28. Elapsed time should be no more than 30 minutes.
29. Build in time tracking functions to check performance.
30. At end of day, dump data sets through modem connection to main office.
31. At main office the data sets will be catalogued and spot checked for accuracy. Time stamps will be profiled for performance. Performance records will be maintained for each service technician to track performance and award bonuses/penalties.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for establishing the layout of a building comprising the steps of:
    placing a scanner on a structure in a first room of the building;
    scanning the first room by the scanner to obtain first room data;
    waiting for the scanner to complete the scanning of the first room;
    forming a representation of the layout of the first room with a computer from the first room data;
    displaying the representation of the layout of the first room on a screen;
    placing a window representation, either with the software of the computer or by a user directing the computer, using a predetermined symbol in the representation of the layout of the first room on the screen where the window is identified in the first room on the screen with the software of the computer; and
    completing the layout of the building.

2. A method as described in claim 1 wherein the scanning step includes the step of emitting a laser beam repeatedly around the first room and obtaining point data from reflections of the laser beam from the first room to obtain first room data with the computer.

3. A method as described in claim 2 including after the first room scanning step, there is the step of identifying an entrance to the first room with the computer from the first room data, and the forming step includes the step of forming a representation of the layout of the first room with the entrance of the first room from the first room data.

4. A method as described in claim 3 including after the first room scanning step, there are the steps of:
    removing the scanner from the first room;
    placing the scanner in a second room adjacent the first room;
    scanning the second room with the scanner to obtain second room data;
    combining the second room data with the first room data with the computer; and
    forming a representation of a layout of the first room with the entrance and the second room from the first room data and the second room data.

5. A method as described in claim 4 including after the first room scanning step, there is the step of identifying dimensions of the first room associated with length and width with the computer.

6. A method as described in claim 5 wherein the identifying the entrance step includes the step of identifying a door in the first room.

7. A method as described in claim 6 wherein the identifying the door step includes the step of adding a representation of the door to the first room data.

8. A method as described in claim 6 including after the identifying the door step, there is the step of identifying a window in the first room.

9. A method as described in claim 8 wherein the identifying the window step includes the step of adding a representation of the window to the first room data.

10. A method as described in claim 9 including after the identifying the door step, there is the step of adding a representation of a feature to the first room data.

11. A method as described in claim 10 wherein the step of adding a feature includes the step of adding a representation of a fireplace, appliance, toilet, tub, sink, cabinet or shower to the first room data.

12. A method as described in claim 11 wherein after the step of adding a representation of a feature, there is the step of adding a representation of a floor covering to the first room data.

13. A method as described in claim 12 wherein the step of adding a representation of floor covering includes the step of adding a representation of hardwood, wall-to-wall carpet, vinyl or ceramic to the first room data.

14. A method as described in claim 13 wherein the step of combining includes the step of aligning a representation of a common wall of the first room data and the second room data.

15. A method as described in claim 14 wherein the forming step includes the step of forming the representation of the layout of the first room with the door, window, feature and floor covering from the first room data and the second room from the second room data.

16. A method as described in claim 15 including after the emitting step, there is the step of connecting the point data to form line segments that represent the layout of the first room with the computer.

17. A method as described in claim 16 including after the connecting step, there is the step of eliminating erroneous line segments with the computer.

18. A method as described in claim 17 wherein the identifying a door step includes the step of placing a representation of a door between associated door line segments that are a predetermined distance apart with the computer.

19. A method as described in claim 18 wherein the identifying a window step includes the step of placing a representation of a window between associated window line segments with the computer.

20. A method as described in claim 19 wherein the step of placing a representation of the door includes the step of viewing the line segments on a screen and picking a symbol of a door from a window menu on the screen and dragging the symbol of the door from the window menu to between the associated door line segments.

21. An apparatus for establishing a layout of a first room comprising:
a scanner for scanning under its own direction the first room of the building to obtain first room data, the scanner having a scan head;
a structure for holding the scanner; and
a mechanism for forming a representation of the layout of the first room from the first room data, said forming mechanism connected to the scanner, the forming mechanism includes a screen on which the representation of the layout of the first room is displayed, the forming mechanism includes a memory which stores the first room data, said memory including a mechanism for identifying a window in the room from the room data, a mechanism for placing a window representation using a predetermined symbol in the layout of the first room on the screen where the window is identified in the first room on the screen, and a mechanism for permitting manual addition of the window representation where the window is identified in the first room by the identifying mechanism.

22. An apparatus as described in claim 21 wherein the forming mechanism forms a representation of the layout with an entrance of the first room from the first room data.

23. An apparatus as described in claim 22 wherein the scanner includes a laser rangefinder which obtains point data for the first room data from the first room, said memory connected to said laser rangefinder.

24. An apparatus as described in claim 23 wherein the forming mechanism includes a computer connected to the memory.

25. An apparatus as described in claim 24 wherein the memory has a mechanism for forming line segments from the point data of the first room data, said line segment forming mechanism connected to the computer.

26. An apparatus as described in claim 25 wherein the forming mechanism includes the screen connected to the computer which shows the line segments which represent the layout of the first room.

27. An apparatus as described in claim 26 wherein the memory includes a mechanism for identifying an entrance from the point data, said entrance identifying mechanism connected to the computer.

28. An apparatus as described in claim 27 wherein the entrance can be the door or a window and wherein the entrance identifying mechanism can include a mechanism for placing a representation of the door or window within the line segments as part of the first room data, said placing mechanism connected to the memory.

29. An apparatus as described in claim 28 wherein the memory includes a mechanism for identifying dimensions of the first room from the first room data, said dimension identifying mechanism connected to the computer.

30. An apparatus as described in claim 29 wherein the memory includes a mechanism for placing a feature into the line segments of the first room data, said feature placing mechanism connected to the computer.

31. An apparatus as described in claim 30 wherein the memory includes a mechanism for displaying a menu having symbols of features, a door and a window on the screen, said symbols able to be chosen from the menu and placed in the line segments on the screen of the first room data, said displaying mechanism connected to the computer.

32. An apparatus as described in claim 31 wherein the memory includes a mechanism for editing the line segments of the first room data, said editing mechanism connected to the computer.

* * * * *